Dec. 17, 1940.	M. W. SCHELDORF	2,225,353
LIGHT MEASURING APPARATUS
Filed May 26, 1938

Inventor:
Marvel W. Scheldorf
by Harry E. Dunham
His Attorney.

Patented Dec. 17, 1940

2,225,353

UNITED STATES PATENT OFFICE 2,225,353

LIGHT MEASURING APPARATUS

Marvel W. Scheldorf, Schenectady, N. Y., assignor to General Electric Company, a corporation of New York Application May 26, 1938, Serial No. 210,247

2 Claims. (Cl. 88—23)

My invention relates to apparatus for measuring light and particularly to such apparatus which includes a photo-electric device having capacitance and variable resistance and which is used for measuring substantially constant or slowly varying radiation. It is the object of my invention to provide an improved apparatus for making such measurements which apparatus, while including a photo-electric device of the same form as employed as before, enables one to avoid certain difficulties heretofore encountered. A further object is the provision of such apparatus which is simple in construction, accurate and reliable in operation and inexpensive to manufacture.

My invention will be better understood from the following description taken in connection with the accompanying drawing and its scope will be pointed out in the appended claims.

Figure 1:
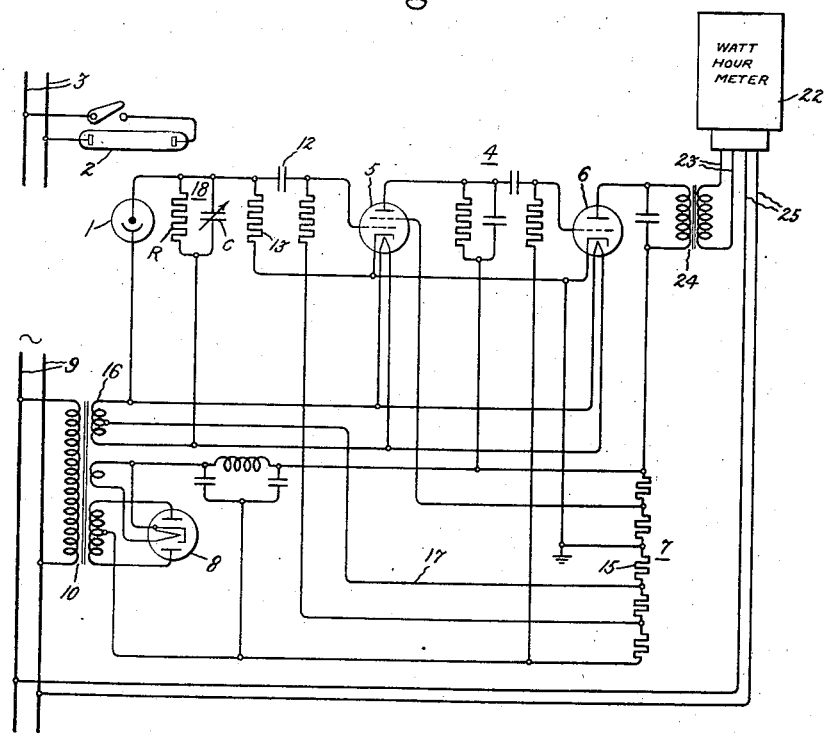
Figure 2:
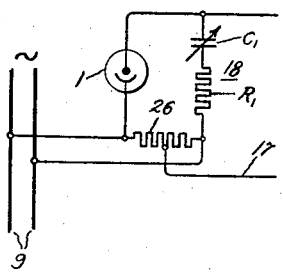

Referring to the drawing, Fig. 1 is a circuit diagram illustrating one embodiment of my invention and Fig. 2 is a detail thereof showing a modification.

In the drawing, I have shown at 1 a photo-electric tube which is arranged to receive radiation from a source 2, such for example as a mercury vapor lamp which is shown connected to be energized from the source of direct current 3. Inasmuch as the radiation received from the source 2 is substantially constant or varies only slowly, I energize the photo-electric tube by alternating current and I amplify the response made thereby by means of the alternating current amplifier 4 whose output circuit connects with the measuring device. The amplifier which I employ is of well known form and is represented as comprising two capacity coupled stages including the electron discharge devices 5, 6. The amplifier may be supplied with direct current from any suitable source. In the drawing, I have shown it supplied through the voltage divider 7 from the full wave rectifier 8 which may be of any suitable well known form, the same being supplied from the source 9 of alternating current through the transformer 10. The input circuit of the amplifier 4 connects through the capacitor 12 with the opposite ends of the resistor 13 whereby it will amplify whatever alternating current traverses that resistor.

The resistor 13 and the section 15 of the divider 7 are included in what may be termed a direct current circuit upon the current of which there is superposed an alternating current whose amplitude depends upon the intensity of the radiation received by the photo-electric tube. The alternating current is supplied by the secondary winding 16 of the transformer 10, the voltage of which winding is low whereby the maximum value of the voltage applied to the tube corresponds to a point on its current-voltage characteristic which is below the knee thereof. The mid-point of the winding 16 connects through the conductor 17 with the lower end of the section 15 of the divider. One end of the secondary 16 connects through the photo-electric tube 1 with the upper end of the resistor 13 whose lower end connects with the upper end of the section 15. The other end of the secondary 16 connects through the balancing means 18 also with the upper end of the resistor 13. Thus, the so-called direct current circuit comprising the source of direct current 15 and the resistor 13 has in effect two branches, the one branch including one-half of the winding 16 and the photo-electric tube 1 and the other branch including the other half of the secondary 16 and the balancing means 18. It will also be seen that the secondary 16, the photo-electric tube 1, and the balancing means 18 form in themselves a closed series circuit for the alternating current induced in the secondary 16.

The balancing means 18 comprises the resistor R and the capacitor C which, in Fig. 1, are shown arranged in parallel. The resistor is made substantially equal in value to the dark resistance of the photo-electric tube. The capacitor C is made substantially equal in value to the capacitance of the photo-electric tube. The capacitance and the dark resistance of the photo-electric tube 1 are therefore balanced with the result that when no radiation reaches the tube no alternating current is superposed upon the direct current passing the resistor 13 and hence no alternating voltage is applied to the input circuit of the amplifier. For the purpose of equalizing the capacitances of the two branch circuits, I preferably employ an adjustable capacitor C whereby after the apparatus is set up this capacitor may be carefully adjusted so that no response is made in the output circuit of the amplifier due to any difference in capacitance of the two branches. Any suitable alternating current responsive device may be employed in the output circuit of the amplifier by which the radiation received by the photo-electric tube may be indicated or measured. I have chosen to illustrate such an indicating or measuring device as comprising the watt hour meter 22 whose current winding connects through the conductors 23 and the transformer 24 with the output circuit of the amplifier and whose voltage winding connects through the conductors 25 with the source of alternating current 9.

The operation of the apparatus will be readily apparent from the above description. When there is no radiation being received by the photo-electric tube 1, there is no alternating current applied to the resistor 13 since the resistance and the capacitance of the tube are completely balanced respectively by the resistor R and the capacitor C. When, however, radiation is received by the photo-electric tube, the resistance thereof decreases in proportion to the amount of radiation received and as a result alternating current is superposed upon the direct current passing the resistor 13, the alternating component being amplified by the amplifier 4 and applied to the current winding of the watt hour meter. It will be understood that the reading of the watt hour meter may be converted into any suitable integrated light units such as lumen-hours or, if desired, the meter may be calibrated to read in such units.

While I have shown the balancing means 18 as comprising the resistor and the capacitor arranged in parallel, these elements may, if desired, be arranged in series as shown, for example, in the modified form illustrated by Fig. 2. If the series arrangement is employed the resistor and capacitor will have somewhat different values than in the parallel arrangement. For example, if in the series arrangement the resistor be denoted by $R_1$ and the capacitor be denoted by $C_1$ then the value of the resistor $R_1$ in terms of the resistor R will be given by the equation:

$$R_1 = \frac{\frac{1}{R}}{\frac{1}{R^2}+\frac{1}{X_C^2}}$$

and $$X_{C_1} = \frac{\frac{1}{X_C}}{\frac{1}{R^2}+\frac{1}{X_C^2}}$$

where $$X_C = \frac{1}{2\pi f C}$$

and $$X_{C_1} = \frac{1}{2\pi f C_1}$$

The modification comprising Fig. 2 also shows that the photo-electric tube and the balancing means therefor may be supplied with alternating current by connecting them with the ends of a resistor, shown at 20, included in an alternating current circuit supplied from the source 9, the conductor 17 being connected with the mid-point of the resistor.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States is:

1. Radiation measuring apparatus comprising a photoelectric device, balancing means therefor having constant resistance and capacitance and a source of alternating current having an intermediate point all together in a series circuit, a source of direct current and an impedance connected in series between said point and a point of said circuit between said device and said balancing means and measuring means responsive to the alternating current superposed on the direct current in said impedance.

2. Radiation measuring apparatus comprising a photoelectric tube, balancing means therefor and a source of alternating current having a mid-point all connected together in a series circuit, said balancing means comprising a resistor whose resistance is substantially equal to the no-radiation resistance of said tube and a capacitor having substantially the same capacitance as said tube, a source of direct current and an impedance connected in series between said point and a point of said series circuit between said tube and said balancing means whereby the direct current in said impedance has an alternating current superposed on it proportional to the radiation received by said device and a meter responsive to said superposed alternating current.

MARVEL W. SCHELDORF.